3,051,661
pH INDICATOR UNITS IN TABLET FORM
Galen F. Collins, Elkhart, Ind., assignor to Miles Laboratories, Inc., Elkhart, Ind., a corporation of Indiana
No Drawing. Filed July 3, 1956, Ser. No. 595,605
7 Claims. (Cl. 252—408)

This invention relates to preparations for determining the hydrogen ion concentration in various liquids, and is particularly concerned with the provision of indicators in tablet form adapted for use over a wide pH range, and by means of which the hydrogen ion concentration of solutions may be determined more quickly and, in some instances, more accurately than with the mixed indicators heretofore employed.

The mixed indicators of the prior art, while generally effective for determining the pH of a wide variety of solutions, nevertheless have not been entirely satisfactory since they are usually in liquid form when prepared for use and, consequently, present the constant hazard of accidental spilling or breakage of their containers, which imposes precautions in their use which unnecessarily impedes pH determination even under ideal conditions. A further disadvantage of liquid mixed indicators of the prior art is that when they are added to the solution to be tested, according to conventional practice, any color or suspended material in the solution may interfere with an accurate determination of the color of the indicator, thereby rendering pH determination unreliable.

In order to overcome some of the shortcomings of liquid indicators, papers impregnated with the conventional indicator dyes have been developed and these, also, have found a certain degree of acceptance in the art. However, indicator papers are customarily supplied in sets requiring two or more sets of papers for a determination; for instance, papers may be obtained which cover a pH range of 1, 3, 5, 7, 9, and 11 using one paper and its companion covers the pH range of 2, 4, 6, 8, and 10. It is very difficult when using such impregnated papers to determine just what paper should be used since a color scale is provided for each and there is considerable overlapping. Several tries may be necessary before one is satisfied that the correct paper has been used for the solution in question.

The present invention is directed to overcoming the aforementioned and other deficiencies of the mixed indicators of the prior art, and accordingly, it is an object of the invention to provide an indicator tablet which will allow accurate determinations of pH in liquids within a wide range of hydrogen ion concentrations without requiring any specialized apparatus other than a standard color chart.

Although the indicator tablets of the invention are useful in all circumstances in which indicators are customarily used, they are particularly adapted for use in those situations in which it is inconvenient to use the conventional liquid indicators, as where the pH determination is to be made outside the laboratory where the usual laboratory facilities are not available. A particularly important use of my indicator tablets is in the determination of pH of body fluids by physicians in the diagnosis or treatment of certain pathological disorders in which an increase or decrease of hydrogen ion concentration in the body fluids, such as urine, is symptomatic.

A further object of the invention is to provide mixed indicator tablets for the above purpose which are inexpensive to prepare, stable in storage, and dependable in use, and which are sufficiently resistant to breakage in ordinary handling to enable them to be carried in portable kits for long periods without physically disintegrating.

Other objects and advantages of the invention will be apparent from the following description of several presently preferred embodiments thereof.

An indicator unit for determining hydrogen ion concentration according to the invention comprises, broadly, a compressed, tableted body containing essentially (1) a small proportion of a mixture of indicator dyes effective to produce the necessary color changes over the desired pH range; (2) a greater proportion of an adsorbent agent for the dyes which is effective to prevent the dyes from being washed through when the liquid to be tested is placed on the tablet, which also acts as an absorbing agent for the liquid to be tested, and which will not affect the pH of such liquid; and (3), as the remainder, a neutral substance or mixture of neutral substances which not only acts as a filler and binder for the tablet, but also helps in providing the proper opacity to the tablet against which the indicator color may be observed; all of such ingredients being intimately mixed so that the indicator dyes, the dye-adsorbent agent, and the neutral filler-binder component are uniformly dispersed throughout the mass.

The individual indicator dyes which I have found eminently satisfactory for use in the tableted indicators of my invention are Brom Cresol Purple, Brom Cresol Green and Methyl Orange since, when combined in the proportions defined hereinafter, they provide distinct color changes at frequent intervals over a wide pH range. The combined weight of the indicator dyes in the final tablet composition comprises a very small proportion of the whole, i.e., from about 0.01% to 0.05% by weight of the tablet, and, of the three dyes used in my preferred compositions, the Methyl Orange is present in the smallest proportion, for a reason which will appear hereinafter. Preferably, the proportion of Brom Cresol Purple:Brom Cresol Green:Methyl Orange is about 5.0:2.5:1, since in that proportion a distinct and easily detected color change is produced for each pH value in steps of one pH unit between pH 2 and pH 9 when a drop of the solution to be tested is applied to the tablet, according to the testing procedure discussed hereinafter. Somewhat greater or smaller proportions of Brom Cresol Purple and Brom Cresol Green relative to Methyl Orange may be used with satisfactory results, if desired. Thus, a range of porportions of Brom Cresol Purple:Brom Cresol Green:Methyl Orange of 4.5–6.5:1.5–3.0:1 is permissible. However, the proportion of Methyl Orange to the combined weights of Brom Cresol Purple and Brom Cresol Green should not appreciably exceed 1:6, since greater proportions of Methyl Orange tend to interfere with the yellowish and greenish shades produced by the mixed indicators at pH 5 and higher.

The agent which I employ in my indicator tablets for adsorption of the dyes, and absorption of the liquids to be tested, is substantially white cellulose powder. Material for this purpose which I have found quite satisfactory is a commercial grade of wood cellulose having an approximate particle size of 45 microns and sold by the Brown Company under the name of "Solka Floc BW-100." When about 15% by weight of this material is incorporated in the tablet, an effective means is provided for stabilizing the dyes on the surface of the tablet when a drop of liquid is added thereto and allowed to soak into the tablet. This provides for an easy comparison of the colors produced on the surface of the tablet with those of a standard color scale. The amount of "Solka Floc"

is not critical and, if desired, it may be employed in proportions of about 10% to 90% by weight of the tablet with satisfactory results. It will also be understood that the aforementioned average particle size of this material, i.e., 45 microns, is not critical, and that cellulose derived from other sources, such as cotton, straw, etc., may be employed, if desired.

The neutral component which comprises the remainder (about 90% to about 10%) of my indicator tablet, the primary function of which is to act as a filler and binder therefor is sodium chloride, since this compound is inexpensive and readily available in the degree of purity needed for this purpose. Examples of other neutral materials which may be substituted for the sodium chloride are potassium chloride, sodium sulfate, and potassium sulphate. Mixtures of the foregoing agents are also satisfactory. The neutral component may also comprise a substance such as substantially white kaolin, diatomaceous silica, or the like, which do not possess the binding property of the compounds just mentioned when compressed. Therefore, when kaolin or similar substances are used as the filler in the present compositions, they will be customarily mixed with a suitable pharmaceutical binder such as sugar, gums (e.g. tragacanth), moist cornstarch, etc., as will be understood by those skilled in the art.

The following example is illustrative of a solid mixed indicator formulation which provides distinct color changes for each difference of one pH unit over the range of pH 2–pH 9:

Example 1

|  | mgm. | Percent |
| --- | --- | --- |
| Brom Cresol Purple | .060 | .020 |
| Brom Cresol Green | .030 | .010 |
| Methyl Orange | .012 | .004 |
| Cellulose powder (Solka-Floc BW-100) | 45.000 | 15.000 |
| Sodium Chloride, crystal | 254.898 | 84.966 |

In Example 1, and in any other indicator formulation according to the invention, Dimethyl Yellow may be substituted for Methyl Orange and used in the same proportions.

The colors obtained in pH tests with aqueous solutions of the dyes in the same proportions as found in Example 1, and the colors obtained with indicator tablets having the composition of Example 1, are as follows:

| pH | Solution | Tablet |
| --- | --- | --- |
| 2 | Orange | Reddish-Orange. |
| 3 | do | Orange. |
| 4 | Yellow-Orange | Yellowish-Orange. |
| 5 | Yellow-Green | Yellow. |
| 6 | Blue-Green | Yellowish-Green. |
| 7 | Blue-Purple | Green. |
| 8 | do | Blue-Green. |
| 9 | do | Blue. |

The formula of Example 1, may be modified to extend its range of effectiveness to from pH 1 to pH 10 by incorporating therein about 0.002% to about 0.003% by weight of Brilliant Yellow, Phenol Red or rosalic acid, and about 0.001% to about 0.002% by weight of the sodium salt of p(p-anilinophenylazo) benzene sulfonic acid or the sodium salt of m(p-anilinophenylazo) benzene sulfonic acid. Such a modification is illustrated in the following example:

Example 2

|  | mgm. | Percent |
| --- | --- | --- |
| Brom Cresol Purple | .0216 | .00864 |
| Brom Cresol Green | .0067 | .00268 |
| Methyl Orange | .0038 | .00152 |
| Brilliant Yellow | .0067 | .00268 |
| p(p-Anilinophenylazo) benzene sulfonic acid sodium salt | .0038 | .00152 |
| Cellulose powder (Solka-Floc BW-100) | 37.5000 | 15.00000 |
| Sodium Chloride, crystal | 212.4574 | 84.98296 |

The following colors are obtained with solutions of unit pH intervals with a tablet formulation prepared according to Example 2:

| pH | Color |
| --- | --- |
| 1 | Brown. |
| 2 | Brownish-Orange. |
| 3 | Orange. |
| 4 | Yellow-Orange. |
| 5 | Greenish-Yellow. |
| 6 | Yellow-Green. |
| 7 | Green. |
| 8 | Greyish-Green. |
| 9 | Grey. |
| 10 | Purple. |

In preparing my mixed indicator tablets, the dye components may be first dissolved in water and added to the previously mixed remaining ingredients of the formula. The wetted mixture is then dried at 70°–80° C. after which it is sifted and compressed into tablets.

In use, all that is necessary is to place on the tablet a drop of the solution to be tested and compare the resulting color with a standard color chart prepared by using the same dyes employed in the tablet. Since only a drop of solution to be tested is applied to the tablet, acurate pH determinations may be obtained even though the solution contains suspended matter or is somewhat colored, as is often the case with body fluids, such as urine.

I claim:

1. A pH indicator unit comprising an intimate homogeneous mixture, compressed in tablet form, of from about 0.01% to about 0.05% by weight, in the aggregate, of Brom Creson Purple, Brom Cresol Green and a member of the group consisting of Methyl Orange and Dimethyl Yellow, from about 10% to about 90% by weight of cellulose powder, and, as the remainder, a neutral, substantially white filler and binding agent, the proportion of Brom Cresol Purple:Brom Cresol Green:the member of said group being 4.5–6.5:1.5–3.0:1.

2. A pH indicator unit according to claim 1 wherein said mixture includes, in addition, about 0.002%–0.003% by weight of Brilliant Yellow, and about 0.001%–0.002% by weight of a member of the group consisting of the sodium salts of p(p-anilinophenylazo) benzene sulfonic acid and m(p-anilinophenylazo) benzene sulfonic acid.

3. A pH indicator unit comprising an intimate homogenous mixture, compressed in tablet form, of from 0.01% to about 0.05% by weight, in the aggregate, of Brom Cresol Purple, Brom Cresol Green, and Methyl Orange, from about 10% to about 90% by weight of cellulose powder, and, as the remainder, a filler selected from the group consisting of sodium chloride, potassium chloride, sodium sulfate, potassium sulfate, and mixtures of a member of the group consisting of kaolin and diatomaceous silica with a pharmaceutical binder, the proportion of Brom Cresol Purple:Brom Cresol Green: Methyl Orange being 4.5–6.5:1.5–3.0:1.

4. A pH indicator unit comprising an intimate homogeneous mixture, compressed in tablet form, of from about 0.01% to about 0.05% by weight, in the aggregate, of Brom Cresol Purple, Brom Cresol Green, and Methyl Orange, from about 10% to about 90% by weight of substantially white cellulose powder and sodium chloride as the remainder, the proportion of Brom Cresol Purple:

Brom Cresol Green:Methyl Orange being 4.5–6.5:1.5–3.0:1.

5. A pH indicator unit comprising, in intimate homogenous admixture and compressed in tablet form:

|  | mgm. | Percent |
|---|---|---|
| Brom Cresol Purple | .060 | .020 |
| Brom Cresol Green | .030 | .010 |
| Methyl Orange | .012 | .004 |
| Cellulose powder | 45.000 | 15.000 |
| Sodium Chloride, crystal | 254.898 | 84.966 |

6. A pH indicator unit comprising, in intimate homogenous admixture, and compressed in tablet form:

|  | mgm. | Percent |
|---|---|---|
| Brom Cresol Purple | .060 | .020 |
| Brom Cresol Green | .030 | .010 |
| Dimethyl Yellow | .012 | .004 |
| Cellulose powder | 45.000 | 15.000 |
| Sodium Chloride, crystal | 254.898 | 84.966 |

7. A pH indicator unit comprising, in intimate homogenous admixture, and compressed in tablet form:

|  | mgm. | Percent |
|---|---|---|
| Brom Cresol Purple | .0216 | .00864 |
| Brom Cresol Green | .0067 | .00268 |
| Methyl Orange | .0038 | .00152 |
| Brilliant Yellow | .0067 | .00268 |
| p(p-anilinophenylazo) benzene sulfonic acid sodium salt | .0038 | .00152 |
| Cellulose powder | 37.5000 | 15.00000 |
| Sodium Chloride, crystal | 212.4574 | 84.98296 |

References Cited in the file of this patent

UNITED STATES PATENTS

| 2,178,550 | Acree | Nov. 7, 1939 |
| 2,606,654 | Davis et al. | Aug. 12, 1952 |
| 2,643,230 | Mooradian | June 23, 1953 |
| 2,663,692 | Corso | Dec. 22, 1953 |